(12) United States Patent
Yan et al.

(10) Patent No.: US 12,346,095 B2
(45) Date of Patent: Jul. 1, 2025

(54) METHOD AND SYSTEM FOR CONTROL OF BATTERY THERMAL MANAGEMENT OF ELECTRIC DRIVE BULLDOZERS BASED ON DEEP LEARNING

(71) Applicant: SHANDONG UNIVERSITY, Shandong (CN)

(72) Inventors: Wei Yan, Jinan (CN); Guoxiang Li, Jinan (CN); Na Mei, Jinan (CN); Bin Hu, Jinan (CN); Qingjiang Wan, Jinan (CN); Rongzhong Li, Jinan (CN); Yinyin Liu, Jinan (CN); Jiashu Ji, Jinan (CN); Jiaqi Li, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 330 days.

(21) Appl. No.: 18/014,448

(22) PCT Filed: Jul. 18, 2022

(86) PCT No.: PCT/CN2022/106154
§ 371 (c)(1),
(2) Date: Jan. 4, 2023

(87) PCT Pub. No.: WO2022/258079
PCT Pub. Date: Dec. 15, 2022

(65) Prior Publication Data
US 2023/0273593 A1   Aug. 31, 2023

(30) Foreign Application Priority Data
Jun. 9, 2021  (CN) .......................... 202110643527.6

(51) Int. Cl.
*G05B 19/4155*   (2006.01)

(52) U.S. Cl.
CPC .................... *G05B 19/4155* (2013.01); *G05B 2219/50333* (2013.01)

(58) Field of Classification Search
None
See application file for complete search history.

(56) References Cited

U.S. PATENT DOCUMENTS

| 2014/0356656 A1 | 12/2014 | Chen et al. |
| 2020/0338959 A1* | 10/2020 | Carlson ............... H01M 10/615 |

FOREIGN PATENT DOCUMENTS

| CN | 109271700 A | * | 1/2019 | ............ G06F 30/20 |
| CN | 111071073 A | * | 4/2020 | |

(Continued)

OTHER PUBLICATIONS

Homan et al., "A realistic model for battery state of charge prediction in energy management simulation tools", 2019, Energy 171, pp. 205-217 (Year: 2019).*

(Continued)

*Primary Examiner* — David Earl Ogg
(74) *Attorney, Agent, or Firm* — Oliff PLC

(57) ABSTRACT

A method and system for control of a battery thermal management (BTM) of an electric drive bulldozer includes: obtaining a load segment at a current moment "t" in a load spectrum; predicting a load segment at a next moment "t+1" in the load spectrum using a Markov chain model; carrying out a weighting calculation of the obtained and predicted load segments; calculating motor speed, motor torque, and a state of charge (SOC) of a battery based on the calculated weight; and taking the calculated motor speed, motor torque, and SOC, and other parameters as input quantities to an electric compressor rotating speed prediction model so as to (Continued)

obtain a desired speed of the electric compressor and further obtain a method for control of the BTM of the electric drive bulldozer.

9 Claims, 2 Drawing Sheets

(56) References Cited

FOREIGN PATENT DOCUMENTS

| | | | |
|---|---|---|---|
| CN | 111261973 A | | 6/2020 |
| CN | 111611750 A | | 9/2020 |
| CN | 113378463 A | | 9/2021 |
| WO | WO-2020051738 A1 | * | 3/2020 |

OTHER PUBLICATIONS

He et al., "Density Functional Theory for Battery Materials", 2019, Energy and Environmental Materials, pp. 264-279 (Year: 2019).*
Aug. 31, 2022 International Search Report issued in Patent Application No. PCT/CN2022/106154.
Aug. 31, 2022 Written Opinion of the International Searching Authority issued in Patent Application No. PCT/CN2022/106154.

* cited by examiner

METHOD AND SYSTEM FOR CONTROL OF BATTERY THERMAL MANAGEMENT OF ELECTRIC DRIVE BULLDOZERS BASED ON DEEP LEARNING

CROSS-REFERENCES TO RELATED APPLICATIONS

This application claims priority benefits to Chinese Patent Application No. 202110643527.6, filed 9 Jun. 2021, the contents of which are incorporated herein by reference.

TECHNICAL FIELD

The present invention belongs to the field of control of battery thermal management (BTM), and in particular, relates to a method and system for control of the BTM of the electric drive bulldozer based on deep learning.

BACKGROUND

Information of the related art part is merely disclosed to increase the understanding of the overall background of the present invention, but is not necessarily regarded as acknowledging or suggesting, in any form, that the information constitutes the prior art known to a person of ordinary skill in the art.

Bulldozers bring a threat to the living environment of people if the exhaust generated by their operation in complex and changeable construction sites such as garbage dumps, large-scale greenhouses, and other environments is difficult to discharge quickly. Electric drive bulldozers have the advantage of zero emission, and are widely used. For the electric drive bulldozer, the normal operation of the battery is the basis for promising its safe operation, but also the core of the electric drive bulldozer power system, and a set of perfect and efficient battery thermal management system (BTMS) is the key to ensure that the battery works in the appropriate temperature range. And, under the technical background that battery technology has not made breakthrough, how to make the battery work in the most reasonable temperature range has become a research hotspot. That is, if the temperature is too low, the electrolyte ion activity inside the battery will be reduced, and the discharge speed of the battery will be reduced, which will seriously affect the vehicle's power performance; if the temperature is too high, it will cause adverse effects of battery polarization, and even cause safety accidents such as fire and explosion, etc.

As an essential part of the BTMS, the power consumption of the electric compressor increases with the increase of speed. The control strategy of the BTMS of the electric drive bulldozer generally sets the compressor speed to several gears, which cannot meet the requirements of specific working conditions. Therefore, how to match the reasonable speed of the electric compressor in real-time according to the heat dissipation demand of the battery pack has great application value for the effective work of the BTMS of electric drive bulldozer and energy conservation and emission reduction. The inventor finds that because that specific heat capacity of the battery is larger, the cool process of the battery is a process which continuously changes along with time, and the actual heat dissipation demand of the battery is difficult to accurately reflect only by considering the states of the bulldozer and the battery at the current moment, thereby cause poor heat dissipation effect of the battery.

SUMMARY

To solve the above technical problems in the background technology, the present invention provides a method and system for control of BTM of electric drive bulldozers based on deep learning, which on the basis of the compressor control strategy constructed by a prediction model of a support vector machine (SVM) improved by a dual-population adaptive genetic algorithm (DPAGA), combining with a first-order Markov chain model to build a weighted working condition that can more accurately reflect the actual heat dissipation demand of the battery, so as to improve the control strategy of the BTMS, make the system meet the cooling requirements of the battery while minimizing the energy consumption.

In order to achieve the above purpose, the present invention adopts the following technical solutions.

The first aspect of the present invention provides a method for control of BTM of the electric drive bulldozer based on deep learning.

The method for control of the BTM of electric drive bulldozers based on deep learning, comprising:
  obtaining a micro-load segment at the current moment in a load spectrum and predicting a micro-load segment at the next moment using a Markov chain model;
  carrying out a weighting calculation of the micro-load segment using the micro-load segment at the current moment and a corresponding weight thereof with the predicted micro-load segment and a corresponding weight thereof, and then calculating a motor speed, a motor torque, and a state of charge (SOC) of battery under the micro-load segment after being weighted; and
  taking a real-time battery outlet water temperature, an occupant cabin temperature, an occupant cabin target temperature and an ambient temperature as well as the motor speed, the motor torque and the SOC which are obtained by calculation after the micro-load segment being weighted as input quantities of an electric compressor rotating speed prediction model to predict an electric compressor speed, so as to obtain a control strategy of the electric compressor speed, and further obtain a method for control of BTM of the electric drive bulldozer.

The second aspect of the present invention provides a system for control of the BTM of electric drive bulldozers based on deep learning.

The system for the control of the BTM of electric drive bulldozers based on deep learning, comprising:
  a micro-load segment prediction module, being configured to obtain a micro-load segment at the current moment in a load spectrum and predicting a micro-load segment at the next moment using a Markov chain model;
  a weighted working condition parameters calculation module, being configured to carry out a weighting calculation of the micro-load segment using the micro-load segment at the current moment and a corresponding weight thereof with the predicted micro-load segment and a corresponding weight thereof, and then calculate a motor speed, a motor torque, and a state of charge (SOC) of battery under the micro-load segment after being weighted; and
  an electric compressor speed prediction module, being configured to take a real-time battery outlet water temperature, an occupant cabin temperature, an occupant cabin target temperature and an ambient temperature as well as the motor speed, the motor torque and the SOC which are obtained by calculation after the micro-load segment being weighted as input quantities of an electric compressor rotating speed prediction model to predict an electric compressor speed, to obtain a method for control of BTM of the electric drive bulldozer.

The third aspect of the present invention provides a computer-readable storage medium.

The computer-readable storage medium, having a computer program stored thereon, and when the program is executed by a processor, implements the steps of the method for control of BTM of electric drive bulldozers based on deep learning as described above.

The fourth aspect of the present invention provides a computer device.

The computer device, comprising a memory, a processor and a computer program stored in the memory and runnable on the processor, and when the processor executes the program, implements the steps of the method for control of BTM of electric drive bulldozers based on deep learning as described above.

Compared to the prior art, the beneficial effects of the present invention are:

(1) According to the present invention, providing a method for control of BTM of electric drive bulldozers based on deep learning, wherein, obtaining a compressor speed prediction model trained by the improved SVM algorithm by using ambient temperature, motor speed, motor torque, battery pack outlet water temperature, battery charge state, occupant cabin temperature, and occupant cabin target temperature are as training samples; then, obtaining an electric compressor speed by introducing a weight of a current micro-load segment and a weight of a next micro-load segment both calculated by using specific formulas into the prediction model, to form a control strategy of the BTM, wherein the next micro-load segment is predicted and obtained by Markov chain model according to the micro-load segment of the current load spectrum; and combined with the evaporator, condenser, micro-channel heat exchanger of the battery, electronic expansion valve and other components, forming the BTMS for electric drive bulldozers. According to the present invention, based on the Markov chain model, building a weighted working condition that more accurately reflects the actual heat dissipation demand of the battery by a custom objective weighting method formula, for controlling the BTMS of electric drive bulldozers, which makes the compressor speed prediction model more accurate.

(2) According to the present invention, performing weighting calculation for the future micro-load segment predicted by the Markov chain model and the micro-load segment at the current moment simultaneously, may more accurately reflect a real-time running load of the electric drive bulldozer, so as to obtain an actual heat dissipation demand of the battery, then combining the compressor speed of the battery thermal management system of the electric drive bulldozer predicted by the improved SVM algorithm with the first-order Markov chain model, obtaining the control strategy of the electric compressor speed, and further obtaining the thermal management control strategy of the battery of the electric drive bulldozer has a smaller error and may effectively improve the heat dissipation effect while minimizing the energy consumption, which provides a basis for the development of the method of the thermal management system control and is of great significance for energy saving and emission reduction.

The advantages of additional aspects of the present invention will be set forth in part in the following description, and in part will be obvious from the following description, or may be learned by practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

Example 1

Figure 1:
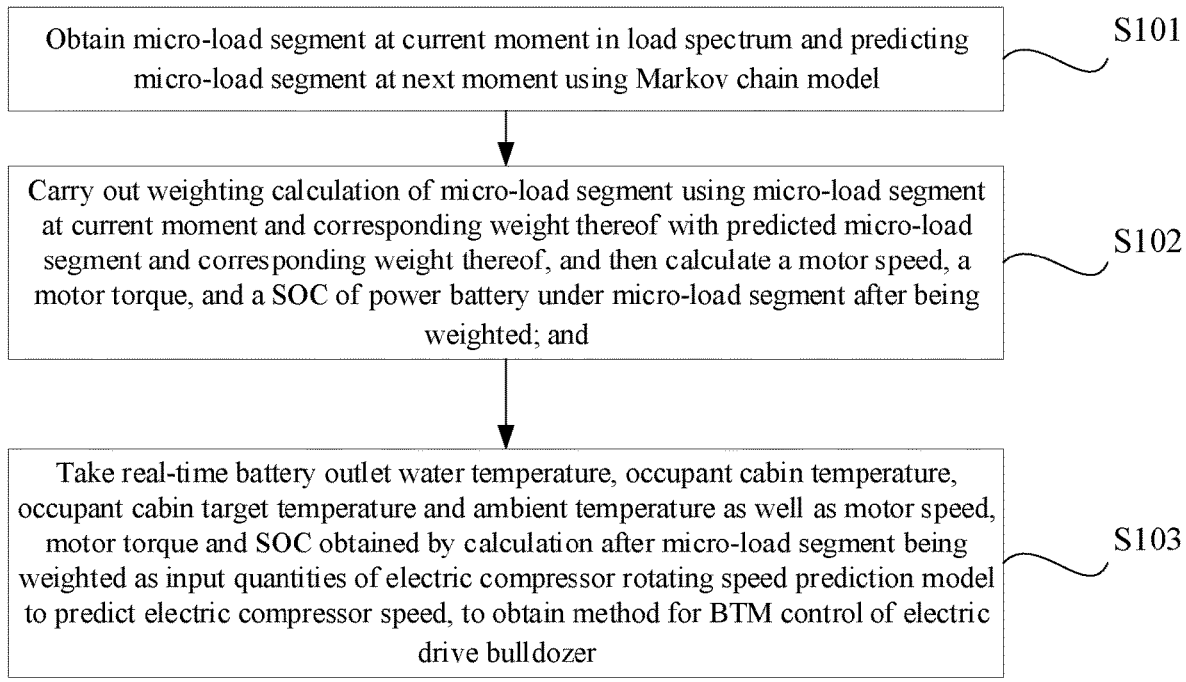
FIG. 1 is a flow diagram of a method for control of BTM of electric drive bulldozers based on deep learning of examples of the present invention.
Figure 2:
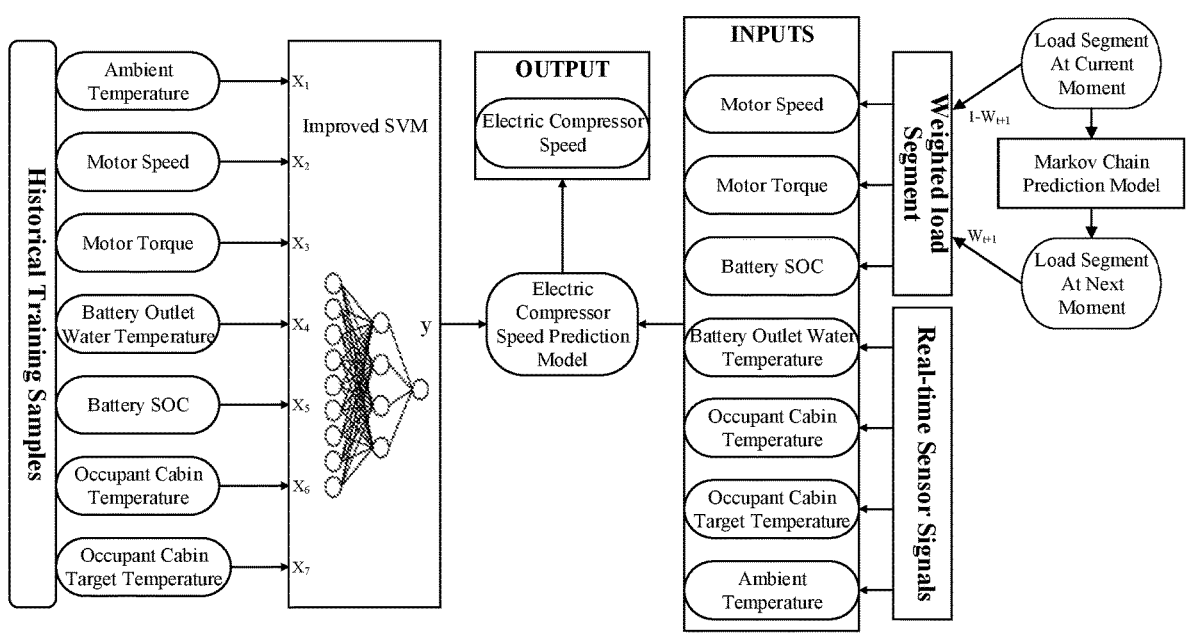
FIG. 2 is a training result of a SVM model for the compressor speed control strategy of examples of the present invention.

As shown in FIG. 1, the present example provides a method for control of battery thermal management (BTM) of electric drive bulldozers based on deep learning, comprising the steps of:

Step S101: obtaining a micro-load segment at the current moment in a load spectrum and predicting a micro-load segment at the next moment using a Markov chain model.

Specifically, before predicting the micro-load segment at the next moment using the Markov chain model, further comprising:

building a probability transfer matrix of each type of working condition using the micro-load segments obtained from historical data of existing load spectrums.

The predicting the micro-load segments of the electric drive bulldozer using the Markov chain model, and building the probability transfer matrix of each type of the working conditions based on the available data, comprising: setting a micro-load in current state to be $s_i$ (i=1, 2, ..., p), a micro-load in next state to be $s_j$ (j=1, 2, ..., q), and letting a micro-load in the state at t moment be $S_t$, a micro-load in the state at t+1 moment be $S_{t+1}$. Then, the transfer probability of transferring from the $S_t=s_i$ in current state to the $S_{t+1}=s_j$ in next state can be expressed as $$S_t = s_i S_{t+1} = s_j P(S_{t+1} = s_j \mid S_t = s_i) = P_{ij} = \frac{N_{ij}}{\sum_{j=1}^{q} N_{ij}},$$

wherein $P_{ij}$ is the transfer probability for the micro-load in current state $s_i$ reaches to the micro-load in next state $s_j$, $N_{ij}$ is the number of events for the micro-load in current state $s_i$ reaches to the micro-load in next state $s_j$, and $$\sum_{j=1}^{q} N_{ij}$$

is the total number of events for the micro-load in current state $s_i$ reaches to any micro-load in the next state.

In the specific implementation, during the prediction of the next micro-load segment using the Markov chain model, selecting the working condition with the maximum transfer probability as the prediction result of the micro-load segment at the next moment based on the micro-load segment at the current moment of the load spectrum.

Specifically, the selecting the working condition with the maximum transfer probability as the prediction result of the micro-load segment at the next moment $s_j$ based on the micro-load segment at the current moment $s_i$, is: $S_{t+1}^P = \arg\max_{s_j} P(S_{t+1} = s_j \mid S_t = s_i)$, so obtaining the first-order Markov chain prediction model.

Step S102: carrying out a weighting calculation of the micro-load segment using the micro-load segment at the current moment and a corresponding weight thereof with the predicted micro-load segment and a corresponding weight thereof, and then calculating a motor speed, a motor torque, and a state of charge (SOC) of battery under the micro-load segment after being weighted.

A correlation coefficient between the load weight at the t moment and the load weight at the t+1 moment is −1, and an objective weight is determined according to the magnitude of the variability of the load spectrums of the two load segments; wherein, the larger the difference, the more information the t+1 moment provides and the greater the role it can play in the comprehensive evaluation, and the greater its weight. The weight at the t+1 moment is:

$$W_{t+1} = -\alpha + \beta e^{\nabla x_t/\gamma},$$

wherein, $\nabla x_t = |x_{t+1} - x_t|$ and $0 \leq \nabla x_t \leq M$, $x_t$ is the micro-load segment of the electric drive bulldozer at the t moment, $x_{t+1}$ is the micro-load segment of the electric drive bulldozer at the t+1 moment, $W_{t+1}$ is the weight of the t+1 moment, a correlation coefficient of the weights of the loads at the t moment and the t+1 moment is −1, the weighted micro-load segment is: $x_t \times (1 - W_{t+1}) + x_{t+1} \times W_{t+1}$, wherein, $\alpha$, $\beta$, $\gamma$ and M are constants.

For example, $W_{t+1} = -0.0316 + 0.02989 e^{\nabla x_t/27.728}$, $W_{t+1} = -0.0316 + 0.02989 e^{\nabla x_t/27.728}$ M=80.

It should be noted that the specific values of $\alpha$, $\beta$, $\gamma$ and M, the skilled person in the field can be specifically set according to the actual situation, and will not be repeated here.

Step S103: taking a real-time battery outlet water temperature, an occupant cabin temperature, an occupant cabin target temperature and an ambient temperature as well as the motor speed, the motor torque and the SOC which are obtained by calculation after the micro-load segment being weighted as input quantities of an electric compressor rotating speed prediction model to predict an electric compressor speed, to obtain a method for control of the BTM of the electric drive bulldozer.

In the present example, the electric compressor speed prediction model is obtained by training by a SVM algorithm improved by DPAGA.

During the performance of the mutation operation, the DPAGA divides the population into two sub-populations, wherein the sub-population with lower fitness performs a self-adaptive Cauchy mutation and the population with higher fitness performs a self-adaptive Gaussian mutation to complete an optimization search process. The individual i is updated to:

$$x_i' = \begin{cases} x_i + \text{range} \cdot F(x_i) \cdot N_i(0,1) & F(x_i) \leq 0.5 \\ x_i + \text{range} \cdot F(x_i) \cdot C_i(1,0) & F(x_i) > 0.5 \end{cases};$$

wherein, $$F(x_i) = \frac{f(x_i) - f_{min}}{f_{max} - f_{min}}$$

is the proportional transformation function, $f(x_i)$ is the fitness function value of the individual $x_i$, $f_{min}$ and $f_{max}$ are the minimum value and the maximum value of the fitness function of each individual in the current iteration of the population, respectively (taking the minimum value as an example, the smaller the fitness function value, the better the individual). $x_i$ and $x_i'$ are the i-th chromosomes before and after the mutation, respectively; range is the moving range of the individual, $N_i(0,1)$ is the random number of Gaussian distribution, and $C_i(0,1)$ is the random number of the Cauchy distribution.

During the training of the electric compressor speed prediction model, setting the initial parameters of the SVM algorithm improved by DPAGA, such as population number, maximum iteration times, crossover probability, generation gap, etc., then using a parameters combination of a penalty factor generated randomly and a variance of Radial Basis Function (RBF) as an initial population, and then performing the operations of selection, crossover, and dual-population adaptive mutation for the population of each generation to find the parameters combination of the penalty factor and the variance of RBF that minimizes the error of the SVM algorithm.

Wherein, the training samples used for training the electric compressor speed prediction model by the improved SVM are obtained through a joint simulation and operation of one-dimensional thermal management software and three-dimensional thermal management software. The different ambient temperatures, vehicle speeds, battery heat dissipations (equivalent to motor speed, motor torque and battery output power), occupant cabin temperatures and occupant cabin target temperatures, which are set for the BTM subsystem, are used as the training sample inputs, the compressor speeds obtained by the simulation and which meet the battery safety temperature requirements and their corresponding duty cycles are used as the training sample outputs, and then the above-mentioned inputs and outputs are used as the training samples of the SVM training the prediction model.

The prediction models of compressor speed under different working conditions can be obtained through the training by the SVM algorithm improved by DPAGA, and then the method for control of the BTM of the electric drive bulldozers may be formed.

Based on the control strategy of BTM obtained by the above-mentioned method, the BTMS for electric drive bulldozers is finally formed by combining the evaporator, the condenser, the microchannel heat exchanger of battery, the electronic expansion valve and other components.

Example 2

The present example provides a system for control of BTM of electric drive bulldozers based on deep learning, specifically comprising the modules of:
- a micro-load segment prediction module, being configured to obtain a micro-load segment at the current moment in a load spectrum and predicting a micro-load segment at the next moment using a Markov chain model;
- a weighted working condition parameters calculation module, being configured to carry out a weighting calculation of the micro-load segment using the micro-load segment at the current moment and a corresponding weight thereof with the predicted micro-load segment and a corresponding weight thereof, and then calculating a motor speed, a motor torque, and a state of charge (SOC) of battery under the micro-load segment after being weighted; and
- an electric compressor speed prediction module, being configured to take a real-time battery outlet water temperature, an occupant cabin temperature, an occupant cabin target temperature and an ambient temperature as well as the motor speed, the motor torque and the SOC which are obtained by calculation after the micro-load segment being weighted as input quantities of an electric compressor rotating speed prediction model to predict an electric compressor speed, to obtain a method for control of BTM of the electric drive bulldozer.

It should be noted here that the modules in the system for control of BTM of electric drive bulldozers based on deep learning of the present example correspond to the steps in the method for control of the BTM of electric drive bulldozers based on deep learning of Example 1, and the specific implementation process is the same, which will not be repeated here.

Example 3

The present example provides a computer-readable storage medium, having a computer program stored thereon; when the program is executed by a processor, implements the steps of a method for control of the BTM of electric drive bulldozers based on deep learning as described above.

Example 4

The present example provides a computer device, comprising a memory, a processor and a computer program stored in the memory and runnable on the processor; when the processor executes the program, implements the steps of a method for control of the BTM of electric drive bulldozers based on deep learning as described above.

Those skilled in the art should understand that the examples of the present invention can be provided as methods, systems, or computer program products. Therefore, the present invention may take the form of hardware examples, software examples, or examples combining software and hardware aspects. Furthermore, the present invention may take the form of a computer program product implemented on one or more computer usable storage media (including but not limited to disk memory, optical memory, etc.) containing computer usable program codes.

The present invention is described with reference to methods, devices (systems) and flowcharts and/or block diagrams of computer program products according to the examples of the present invention. It should be understood that each of the processes and/or boxes in the flowchart and/or block diagram, and the combination of the processes and/or boxes in the flowchart and/or block diagram, may be implemented by computer program instructions. These computer program instructions may be provided to a processor of a general purpose computer, a specialized computer, an embedded processor, or other programmable data processing device to produce a machine such that the instructions executed by the processor of the computer or other programmable data processing device produce a device for implementing the functions specified in one process or multiple processes of the flowchart and/or one box or multiple boxes of the block diagram.

These computer program instructions may also be stored in a computer-readable memory capable of directing the computer or other programmable data processing apparatus to operate in a particular manner such that the instructions stored in such the computer-readable memory produce an article of manufacture comprising an instruction device that implements the function specified in one process or a plurality of processes of the flowchart and/or in one box or a plurality of boxes of the block diagram.

These computer program instructions may also be loaded onto a computer or other programmable data processing device to enable a series of operational steps to be performed on the computer or other programmable device to generate a computer implemented process, so that instructions executed on a computer or other programmable device provide steps for implementing functions specified in one process or a plurality of processes of the flowchart and/or in one box or a plurality of boxes of the block diagram.

Those skilled in the art can understand that the realization of all or part of the processes in the methods of the above examples can be accomplished by instructing relevant hardware through a computer program. The program can be stored in a computer-readable storage medium. When the program is executed, it may comprise the processes of the examples of the above methods. The storage medium may be a disk, optical disc, Read-only memory (ROM) or random access memory (RAM), etc.

The foregoing descriptions are merely preferred examples of the present invention, but not intended to limit the present invention. A person skilled in the art may make various alterations and variations to the present invention. Any modification, equivalent replacement, or improvement made within the spirit and principle of the present invention shall fall within the protection scope of the present invention.

What is claimed is:
1. A computer-readable non-transitory storage medium storing a computer program that, when executed by a processor, causes the processor to perform a method for control of a battery thermal management (BTM) of an electric drive bulldozer, comprising:
   obtaining a load segment of a current moment "t" in a load spectrum of a running load of the electric drive bulldozer;

predicting the load segment of a next moment "t+1" using a Markov chain model;
carrying out a weighting calculation by using the load segment of the current moment "t" and a corresponding weight thereof with the predicted load segment of the next moment "t+1" and a corresponding weight thereof,
calculating a motor speed, a motor torque, and a state of charge (SOC) of a battery of the electric drive bulldozer based on the weighted load segment;
taking a real-time battery outlet water temperature, an occupant cabin temperature, an occupant cabin target temperature, an ambient temperature, and the calculated motor speed, the calculated motor torque and the calculated SOC which are calculated based on the weighted load segment, as input quantities of an electric compressor rotating speed prediction model to predict a rotating speed of an electric compressor of the electric drive bulldozer; and
controlling the rotating speed of the electric compressor of the electric drive bulldozer according to the predicted rotating speed of the electric compressor of the electric drive bulldozer so as to achieve control of the BTM of the electric drive bulldozer.

2. The computer-readable non-transitory storage medium according to claim 1, wherein before predicting the load segment of the next moment "t+1" using the Markov chain model,:
building a probability transfer matrix of each type of working condition using load segments obtained from historical data of existing load spectrums of running loads of the electric drive bulldozer.

3. The computer-readable non-transitory storage medium according to claim 2, wherein during the prediction of the load segment of the next moment "t+1" using the Markov chain model, selecting a working condition with a maximum transfer probability as a prediction result of the load segment of the next moment "t+1" based on the obtained load segment of the current moment "t" in the load spectrum.

4. The computer-readable storage non-transitory medium according to claim 1, wherein a calculation formula of the weight of the predicted load segment is:

$$W_{t+1} = -\alpha + \beta e^{\nabla x_t / \gamma},$$

wherein, $\nabla x_t = |x_{t+1} - x_t|$, and $0 \leq \nabla x_t \leq M$, $x_t$ is a load segment of the electric drive bulldozer at the current moment "t", $x_{t+1}$ is the load segment of the electric drive bulldozer at the next moment "t+1", $W_{t+1}$ is the weight of the load segment of the next moment "t+1," wherein the weighted load segment is: $x_t \times (1 - W_{t+1}) + x_{t+1} \times W_{t+1}$
wherein, $\alpha$, $\beta$, $\gamma$ and M are constants set according to predetermined criteria.

5. The computer-readable storage non-transitory medium according to claim 1, wherein the electric compressor rotating speed prediction model is obtained by training a support vector machine (SVM) algorithm that is optimized by a dual-population adaptive genetic algorithm (DPAGA).

6. The computer-readable storage non-transitory medium according to claim 1, wherein during a training of the electric compressor speed prediction model, setting initial parameters of a support vector machine (SVM) algorithm that is optimized by a dual-population adaptive genetic algorithm (DPAGA)
wherein the training includes initializing a population using parameters combination of a penalty factor generated randomly and a variance of Radial Basis Function (RBF), and then performing operations of selection, crossover, and dual-population adaptive mutation for the population of each generation to find the parameters combination that minimizes an error of the SVM algorithm.

7. The computer-readable storage non-transitory medium according to claim 1, wherein training samples for training the electric compressor rotating speed prediction model are obtained through a joint simulation and operation of a one-dimensional thermal management software and a three-dimensional thermal management software.

8. A computer device, comprising:
a memory,
a processor and a computer program stored in the memory and runnable on the processor; when the processor executes the computer program, implements a method for control of a battery thermal management (BTM) of an electric drive bulldozer, comprising:
obtaining a load segment of a current moment "t" in a load spectrum of a running load of the electric drive bulldozer;
predicting the load segment of a next moment "t+1" using a Markov chain model;
carrying out a weighting calculation by using the load segment of the current moment "t" and a corresponding weight thereof with the predicted load segment of the next moment "t+1" and a corresponding weight thereof,
calculating a motor speed, a motor torque, and a state of charge (SOC) of a battery of the electric drive bulldozer based on the weighted load segment;
taking a real-time battery outlet water temperature, an occupant cabin temperature, an occupant cabin target temperature, an ambient temperature, and the calculated motor speed, the calculated motor torque and the calculated SOC which are calculated based on the weighted load segment, as input quantities of an electric compressor rotating speed prediction model to predict a rotating speed of an electric compressor of the electric drive bulldozer; and
controlling the rotating speed of the electric compressor of the electric drive bulldozer according to the predicted rotating speed of the electric compressor of the electric drive bulldozer so as to achieve control of the BTM of the electric drive bulldozer.

9. A method for control of a battery thermal management (BTM) of an electric drive bulldozer, comprising:
obtaining a load segment of a current moment "t" in a load spectrum of a running load of the electric drive bulldozer;
predicting the load segment of a next moment "t+1" using a Markov chain model;
carrying out a weighting calculation by using the load segment of the current moment "t" and a corresponding weight thereof with the predicted load segment of the next moment "t+1" and a corresponding weight thereof,
calculating a motor speed, a motor torque, and a state of charge (SOC) of a battery of the electric drive bulldozer based on the weighted load segment;
taking a real-time battery outlet water temperature, an occupant cabin temperature, an occupant cabin target temperature, an ambient temperature, and the calculated motor speed, the calculated motor torque and the calculated SOC which are calculated based on the weighted load segment, as input quantities of an electric compressor rotating speed prediction model to predict a rotating speed of an electric compressor of the electric drive bulldozer; and controlling the rotating speed of the electric compressor of the electric drive bulldozer according to the predicted rotating speed of the electric compressor of the electric drive bulldozer so as to achieve control of the BTM of the electric drive bulldozer.

\* \* \* \* \*